United States Patent [19]
Walthall et al.

[11] 4,316,588
[45] Feb. 23, 1982

[54] FISHING LINE SPOOL HOLDER

[75] Inventors: Bobby K. Walthall, Arlington; Sammy E. Harris, Onalaska, both of Tex.

[73] Assignee: Chaparral Marine Products, Inc., Onalaska, Tex.

[21] Appl. No.: 152,488

[22] Filed: May 22, 1980

[51] Int. Cl.³ ............................................. B65H 49/00
[52] U.S. Cl. ................................................. 242/129.62
[58] Field of Search .................. 242/104, 129.5, 129.6, 242/129.62, 55.3; 43/25.2

[56] References Cited
U.S. PATENT DOCUMENTS

| | | | |
|---|---|---|---|
| 2,261,943 | 11/1941 | Rogers | 242/104 |
| 3,011,735 | 12/1961 | Lachat | 242/118.4 |
| 3,259,335 | 7/1966 | Rosen | 242/129.1 |
| 3,799,466 | 3/1974 | Adams | 242/55.2 |

*Primary Examiner*—Leonard D. Christian
*Attorney, Agent, or Firm*—Hill, Van Santen, Steadman, Chiara & Simpson

[57] ABSTRACT

A line spool holder having a U-shaped frame which includes a suction cup for securement to a fixed support such as a boat gunwale so that a single individual may conveniently transfer fishing line from a spool to a fishing reel. A means for securing the fishing line to the holder when not being used is also provided.

5 Claims, 4 Drawing Figures

FISHING LINE SPOOL HOLDER

BACKGROUND OF THE INVENTION

1. Field of the Invention

The field of this invention is fishing line spool holders used by fishermen to transfer fishing line from the spool to the reel.

2. Prior Art

There has been provided heretofore a spool holder believed to have been marketed under the trademark "Reel Friend" consisting of a U-shaped rod and including at the bight end thereof a U-shaped integral clamp adapted to afford purchase on a rod.

SUMMARY OF THE INVENTION

This invention is a spool holder device suitable for use in transferring fishing line from a spool to a fishing reel by a single individual. The spool holder is comprised of a U-shaped frame having a base and two upright arms, sufficiently resilient, non-parallel and inwardly biased to permit the spool of line to be held between said arms without substantial transverse movement. The U-shaped frame is attached to some fixed object, such as a gunwale or a seat of a boat, by means of a suction cup attached to the base of said U-shaped frame by means of a screw. Two trunnions, placed essentially opposite one another along the longitudinal axis, provide the means for supporting the spool of line between the two upright arms of said U-shaped frame. The trunnions permit the spool to be rotated about its center axis while line is being transferred from the spool to the fishing reel or vice versa. A transverse slit is placed across a protuberance located at the apex of one of the upright arms. The slit is of such a narrow width so as to provide a locking mechanism for the fishing line placed within it. The slit acts to prevent knots and tangles from forming in the fishing line when said line is not in use.

DESCRIPTION OF THE PREFERRED EMBODIMENTS

While the principles of the present invention find a particular utility in a fishing line spool holder, it will be understood that the spool holder arrangement of the present invention may be utilized in other combinations. By way of exemplary disclosure of the best mode of practicing the invention, and by way of enabling one of ordinary skill in the art to practice my invention, one embodiment is shown in FIGS. 1-4.

Figure 1:
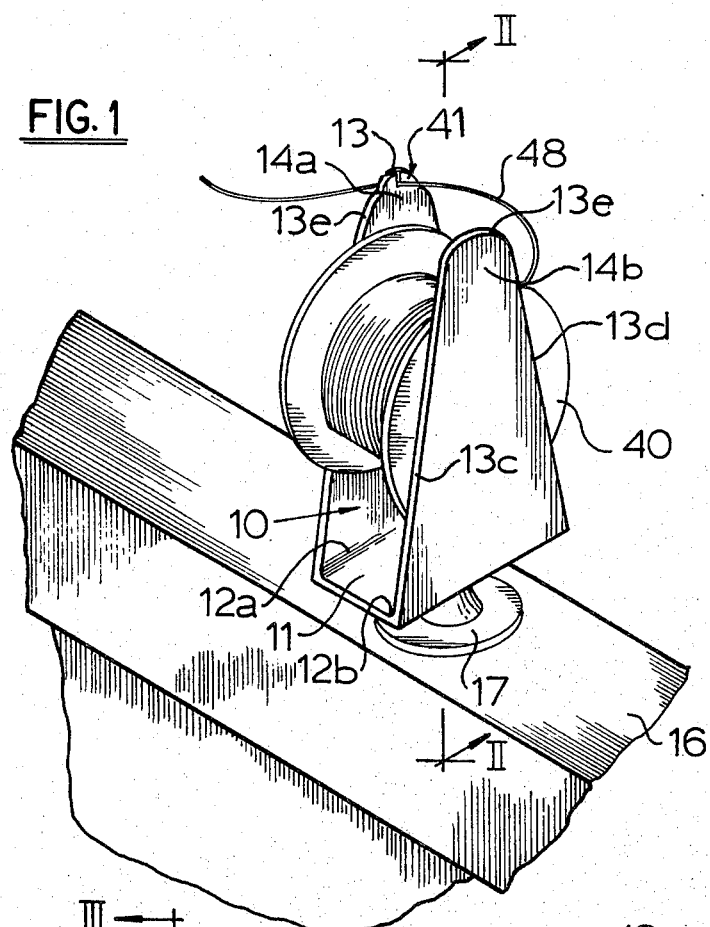
FIG. 1 is a perspective view of a spool holder provided in accordance with this invention.

In FIG. 1, a U-shaped frame 10 has a base or bight portion 11 of generally rectangular configuration and is joined along its long edges 12a, 12b to two inwardly biased, resiliently flexible upright arms 13a, 13b at substantially right angles to the base 11. Each of the upright arms 13a, 13b has converging upwardly extending edges 13c and 13d prescribing an essentially triangular shape with a generally curved surface 13e forming an apex 14a, 14b. In FIG. 1, a fishing line spool holder 10 is shown as it would normally be used in the environment of a fishing boat.

In order to attach the frame 10 in securement to a fixed object such as a gunwale 16 or the seat of a boat, it is contemplated by the present invention that there be provided a suction cup 17. The suction cup 17 is a cup-shaped object of rubber or plastic and has a generally cylindrical body portion or shank 18 with outwardly flaring walls 19 terminating in a circular lip 20, thereby to circumscribe a cup-like cavity or recess 21. The suction cup 17 is adapted to form a partial vacuum when it is collapsed or pressed against a flat adherent surface, thus drawing the suction cup 17 into firm assembly with the adjoining surface.

As further contemplated by this invention, the cylindrical shank or body protion 18 is interiorly recessed with a centrally disposed bore 22 which is counterbored as at 23, thereby to form a re-entrant type recess for conformably receiving a correspondingly shaped headed fastening means shown generally at 24.

In this form of the invention, the headed fastening means takes the form of a screw threaded stud 26 having a cylindrical head 27 which conformably seats in the bore 22 and an enlarged flat cylindrical head 28 which conformably seats in the counterbore recess 23. The suction cup 17 is secured to the base 11 of the U-shaped frame 10 by means of a screw threaded opening 29 formed in the base 11 which is adapted to receive the stud 26.

In order to secure a spool of fishing line between the arms 13a and 13b, flat inner surfaces 30 and 31 are provided, each of which is particularly characterized by the formation thereon of registering axles which are in the nature of trunnions or cantilever type bearing supports 32 and 33. Each trunnion or bearing support 32,33 comprises a cylindrical embossment projecting inwardly from the respective flat surfaces 30 and 31 in axial registration with one another and having circular outer bearing surfaces 34 and 36 and flat inner surfaces 37 and 38. The bearing supports 32 and 33 are received in correspondingly shaped openings found at the center axis of fishing line spools and will therefore rotatably support a spool 40 when inserted between the arms 13a and 13b.

The spacing dimension between the arms 13a and 13b is selected to be compatable with the width of commercially available fishing spools 40. The inwardly biased, resiliently flexible upright arms 13a,13b provide sufficient tensile strength so as to supply a suspending means for said fishing line spool 40. The disposition of the arms 13a,13b enables the spool to be rotated while maintaining its position between said arms 13a,13b. The fact that the arms 13a,13b are inwardly biased provides a frictional braking effect against the rotational motion of said spool 40. This prevents more line being pulled off said spool 40 than is desired.

In order to lock the line against inadvertent pay out, the spool holder 10 is provided with a line locking means which in this form of the invention takes the form of an upwardly projecting embossment or protuberance 41 found on the upper edge 13d of one of the arms 13a and which protuberance 41 is slit to form a pair of fingers 46,47 at the end of the arm for gripping the fishing line. More specifically, a transverse slit 13 is located to extend across the protuberance 41 and is of sufficiently narrow width so as to lock a fishing line 48 with a finger gripping purchase thereby preventing the fishing line from developing tangles when not in use.

Figure 2:
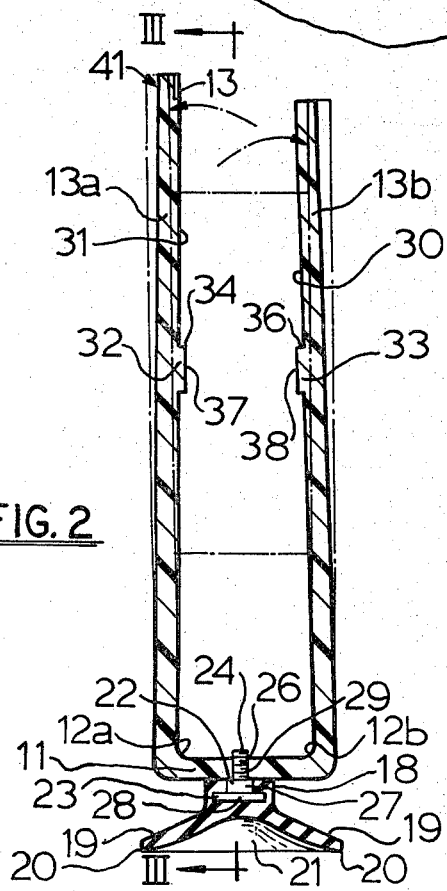
FIG. 2 is a cross sectional view taken on line II—II of FIG. 1.
Figure 3:
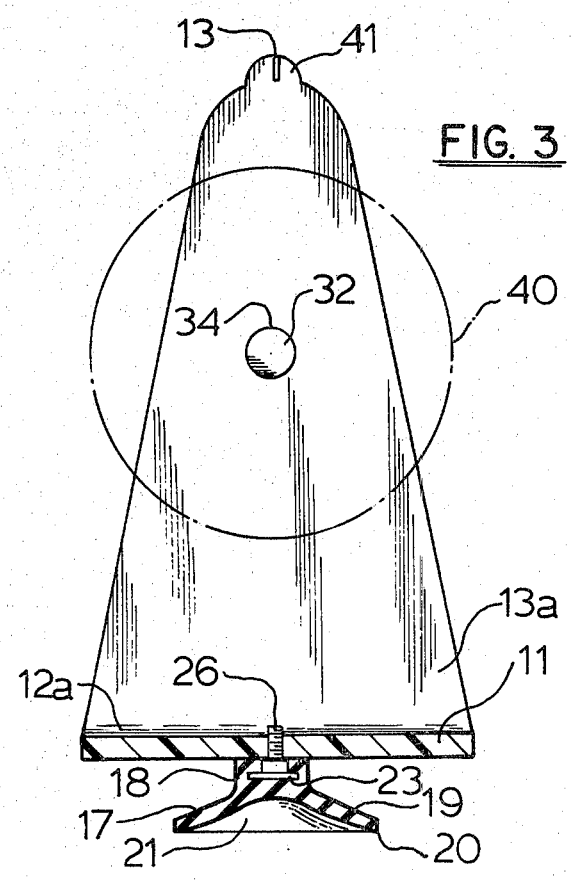
FIG. 3 is a cross sectional view taken on line III—III of FIG. 2.

As shown in FIG. 2, arms 13a,13b are both flexibly resilient and inwardly biased by an amount illustrated by the vertical lines shown in shadow lining. Because the arms 13a,13b are flexibly resilient, a spool is placed between the two arms by moving the arms 13a, 13b away from each other with reference to the base 10 and inserting the spool between them. The arms 13a,13b are then released and permitted to resume their normal inwardly biased disposition. The spool is placed between the two upright arms 13a,13b in such a manner so that the center axis of the spool is between the two trunnions 32, 33 on the interior walls of the upright arms 13a,13b. By placing the spool in that position, the spool is secured between the two inwardly biased upright arms 13a,13b which prevents substantially any transverse movement by the spool. By placing the central axis of the spool between the two trunnions 32,33 the spool is secured by said trunnions and can be rotated around its center axis while maintaining the spool in an essentially stationary position between the two upright arms 13a,13b.

By virtue of having the suction cup 17, a convenient means is provided for one person to change the fishing line on his reel when it is not possible to have the assistance of another person. By placing the center axis of the spool 40 between the trunnions 32,33 the spool is able to be rotated around its center axis while the trunnions, 32,33, positioned essentially along the longitudinal center line of the interior wall of the upright arms 13a,13b, are able to maintain the spool in a substantially stationary position. The transverse slit 13 placed across the protuberance 41 positioned at the apex of one of the upright arms 13a projects into a highly accessible location through which the fishing line may be locked in place with great facility and ease after use.

Figure 4:
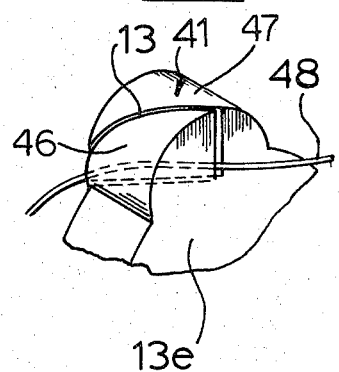
FIG. 4 is an enlarged fragmentary view showing additional details of the invention.

FIG. 4 represents an enlarged view of the protuberance 41 located at the apex of one of the upright arms 13a. The transverse slit 13 placed across the protuberance 41 separates the protuberance into two separate fingers 46 and 47, and the width of the transverse slit 13 is small enough so as to lock in any commercially available fishing line placed within it. This is especially helpful with monofilament line, which has a great tendency to develop tangles when being stored on a spool. In addition, it provides an efficient means for the user to locate the fishing line 48 the next time he desires to transfer fishing line to a reel.

Because of its location at the apex of one of the upright arms 13a, the protuberance 41 also minimizes the chance that the fishing line 48 will somehow become dislodged from the transverse slit 13.

Although various modifications might be suggested by those skilled in the art, it should be understood that I wish to embody within the scope of the patent warranted hereon all such modifications as reasonably and properly come within the scope of my contribution to the art.

We claim as our invention:

1. A fishing line spool holder used for transferring fishing line to and from a fishing reel and comprising:
   (a) A U-shaped frame having a base and two essentially nonparallel, spaced-apart, resiliently flexible upright arms attached on opposite sides to said base and inwardly biased so as to provide sufficient tensile strength to suspend a spool of fishing line between said upright arms and a frictional braking effect against the rotation of said spool;
   (b) first and second trunnions, one protruding from each interior wall of said spaced apart upright arms affixed substantially opposite one another along the longitudinal center line of each said interior wall of each said upright arms, and removably and rotatably supporting a spool of fishing line held essentially between them along the center axis of the spool while preventing any substantial transverse movement of the spool, whereby the spool is able to be rotated and to unwind fishing line in the amount desired;
   (c) a suction cup selectively attachable to a fixed object such as the gunwale or seat of a boat;
   (d) fastening means connected in firm assembly to said suction cup and to the base of said U-shaped frame whereby said spool holder may be used in situ to transfer fishing line to a reel by a single individual; and
   (e) a protuberance positioned at the apex of one of the said spaced apart upright arms through which protuberance a slit is placed so as to permit the fishing line to be locked into said slit when the fishing line is not being used.

2. The fishing line spool holder of claim 1 in which the U-shaped frame is constructed of resilient plastic and the arms are biased inwardly sufficient to obtain a clamping purchase on the spool placed therein.

3. A fishing line spool holder used for transferring fishing line to and from a fishing reel comprising,
   (a) a U-shaped frame having a base and two upright spaced apart arms attached to opposite sides of said base,
      said two upright spaced arms of said U-shaped frame being inwardly biased towards each other, essentially nonparallel, resiliently flexible, and are joined on opposite sides of said base to provide sufficient tensile strength to suspend a spool of fishing line between said upright arms of said U-shaped frame,
   (b) cantilever trunnion means for removably and rotatably mounting a spool of fishing line in said U-shaped frame,
   (c) suction cup means on said base for connecting said frame to an adjoining support surface,
      said suction cup means comprising a suction cup selectively attachable to the gunwale or seat of a boat and having a cylindrical shank portion board and counterboard to form a recess adjacent the base portion of said U-shaped frame,
   (d) a fastening means received in said recess of said shank portion and having a correspondingly shaped headed fastening means for locking engagement with said suction cup means,
      said fastening means having a portion engageable with said base of said frame member in firm assembly therewith,
   (e) and line locking means on one of said upright arms for receiving and locking a fishing line therein, whereby said spool holder may be selectively used in situ in a fishing boat to transfer fishing line to a reel by the user thereof.

4. The fishing line spool holder of claim 1 in which said line locking means comprises an upward protuberance positioned at the apex of one of the upright members and through which upward protuberance a transverse slit is placed to form a pair of fingers for gripping a fishing line.

5. The fishing line spool holder of claim 3 in which said trunnion means comprise first and second trunnions, one each projecting inwardly from the interior walls of said upright member and forming biasing surfaces, affixed substantially opposite from one another along the longitudinal center line of each said interior wall of each said upright arm.

* * * * *